June 3, 1947.  P. H. LIGHT  2,421,630
PROTECTION OF ALTERNATING CURRENT ELECTRIC POWER SYSTEMS
Filed Oct. 16, 1945
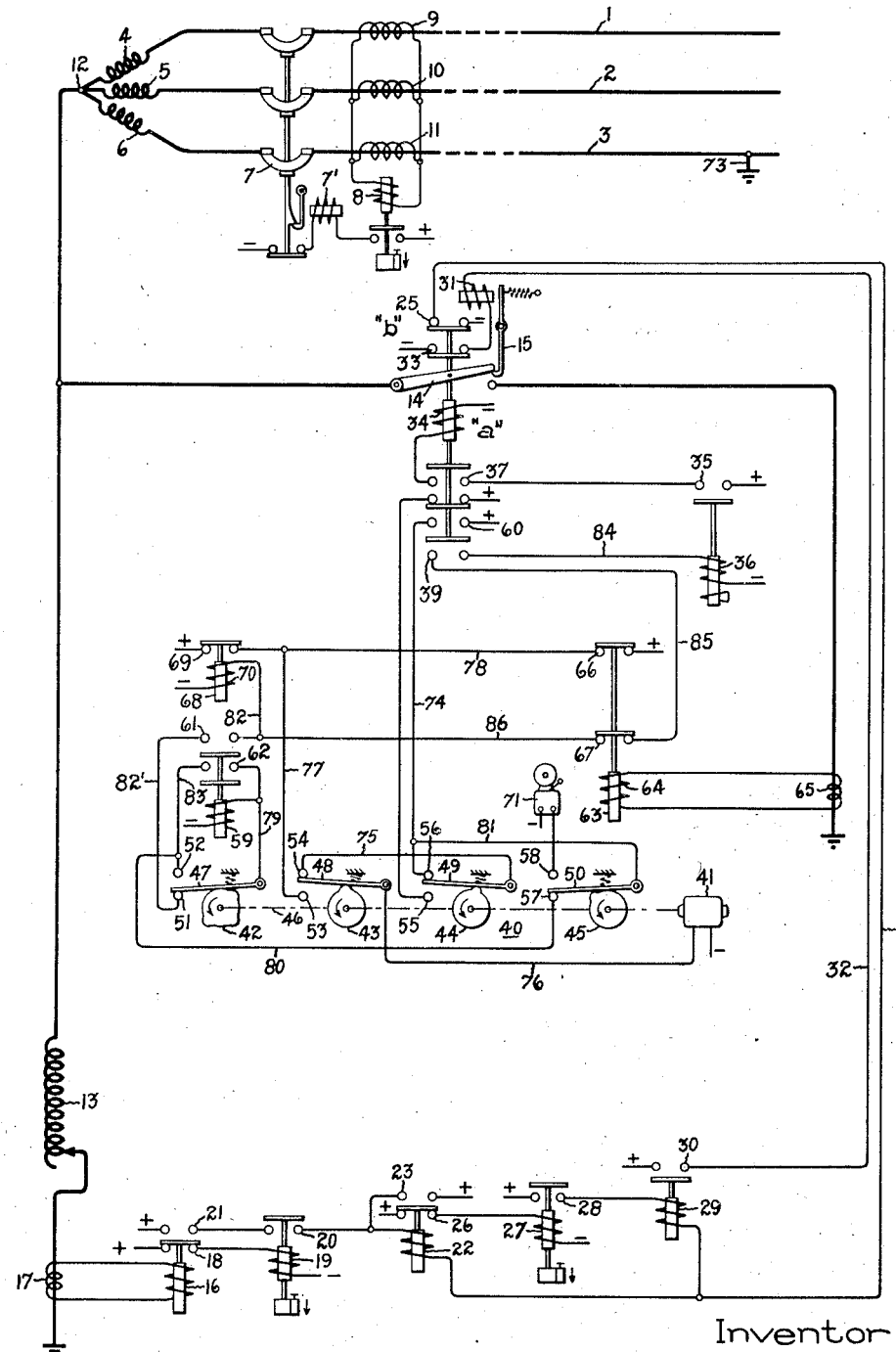
Inventor:
Philip H. Light,
by Ernest C. Britton
His Attorney.

Patented June 3, 1947

2,421,630

UNITED STATES PATENT OFFICE 2,421,630

PROTECTION OF ALTERNATING CURRENT ELECTRIC POWER SYSTEMS

Philip H. Light, Schenectady, N. Y., assignor to General Electric Company, a corporation of New York Application October 16, 1945, Serial No. 622,605

9 Claims. (Cl. 171—97)

My invention relates to improvements in protective apparatus for alternating current electric systems of the type wherein a fault to ground on one phase conductor of the system substantially increases the capacitive current to ground of the ungrounded phase conductors of the system and more particularly to such systems when they have, from a neutral point of the system to ground, a connection which has a zero phase sequence inductive reactance operative on the occurrence of a ground on a phase conductor of the system effectively to suppress the capacitive current to ground at the grounded point.

In United States Letters Patent 1,537,371, issued May 12, 1925, there is disclosed an arrangement for suppressing faults to ground of a transient or arcing character by connecting in the system a grounding impedance or impedances whose inductive reactance is such that the zero phase sequence inductive reactance of the system is equal to the zero phase sequence capacitive reactance of the system. Such impedances are known to the art as ground fault neutralizers since their function is to neutralize the unbalanced capacitive or leading current to ground of the system on the occurrence of a fault to ground by a substantially equal inductive or lagging current whereby to suppress ground faults of a transient character.

Although most ground faults are of a transient character, some are of a sustained character. It is customary to clear such sustained ground faults by a ground fault protective relaying arrangement. Accordingly, as disclosed, for example, in United States Letters Patent 1,378,557, issued May 17, 1921, it is usual to by-pass the ground fault neutralizer by closing a switch in a neutral to ground connection after a ground fault has lasted a predetermined time long enough for the ground fault neutralizer to function. With such ground fault relaying arrangements, it is impractical in case of faults which the ground fault neutralizer cannot suppress to secure that selectivity of relay operation which will, in case of such faults, disconnect only the faulty portion of the system and yet maintain continuity of service on the sound portions. This is in part due to insufficient fault current to insure the necessary discrimination within the sensitivity limits of the relays. Moreover, when selectivity is based on the use of ground fault directional relays, the variation in power factor at any point of the system, in dependence on the location of the fault, is so small that it precludes the use of prearranged relay settings suitable for selective operation regardless of the fault location.

However, if a system is so arranged that one or more of its neutral points may be grounded to accord with a prearrangement of relay settings, then selectivity can be obtained because the factors which militate against the desired relay operation may be eliminated by the grounding of the system. In other words, the system set up, as far as the flow of ground fault current is concerned, is practically that for which prearranged settings within the discriminating ability of the relays are determined since there is usually plenty of fault current with a large power factor variant for different fault locations.

Accordingly, if after a predetermined time sufficient for the ground fault neutralizer to clear a transient fault, the fault still exists, it is desirable, as disclosed in United States Letters Patent 2,258,-248, issued October 7, 1941, to put the system grounding connections in condition to correspond with the prearranged selectivity of the ground fault relays so that they may have an opportunity to clear the fault. In some cases, depending in part on the type of switching means used to establish the grounding connections, it is necessary to prevent the opening of the grounding switch as long as current is flowing in the grounding connection which the switch completes.

For reasons of economy, it is desirable to design the ground fault neutralizer with a relatively short time rating which is, however, more than sufficient for the time required to suppress a ground fault of a transient character. For this reason, it is necessary to leave the by-pass switch closed as long as there is any sustained ground fault current flow.

Conditions other than ground faults, however, produce a displacement of the neutral and cause current to flow in the ground fault neutralizer. One such condition occurs when there is an open phase conductor not grounded. Such condition is hazardous because the proportioning of the inductive reactance of the ground fault neutralizer is such as to produce a resonant circuit with a consequent large flow of current in the neutralizer. If such a large flow of current is maintained longer than the time rating of the neutralizer, damage is liable to happen to the neutralizer and associated apparatus. But such a large flow of current effects the closing of the by-pass switch. When this occurs, the resonant condition is destroyed and there is relatively little flow through the by-pass switch. In fact, there is insufficient current flow through the by-pass switch to prevent the reopening thereof. Consequently, in case of an open phase conductor, the by-pass switch tends to close. However, since in most installations it is desirable to have the by-pass switch 14 opened automatically after a sustained ground fault is cleared, trouble would result on an open phase conductor condition since the by-pass switch would tend to close and open repeatedly. Such pumping action tends to destroy the switch and its associated devices and also constitutes a hazard to the system.

An object of my invention is to provide improved protective apparatus whereby the automatic reopening of the by-pass switch can be effected only a limited number of times on the occurrence of an open phase conductor without interfering with the intended action of the ground fault neutralizer and its associated by-pass switch on the occurrence of ground faults and particularly sustained ground faults. Another object of my invention is to provide improved protective apparatus for limiting the number of times the by-pass switch is opened and closed for any one abnormal condition of the system and finally leaving the switch closed in case of an open phase conductor whereby to protect the system including its ground fault neutralizers and other grounding connections. These and other objects of my invention will appear in more detail hereinafter.

In accordance with my invention, I provide in an electric system of the type wherein a fault to ground on one phase conductor of the system substantially increases the capacitive current to ground of the ungrounded conductors of the system and wherein at least one neutral point of the system is grounded through an impedance whose inductive reactance is such that the zero phase sequence inductive reactance of the system is substantially equal to the zero phase sequence capacitive reactance of the system and wherein the impedance is arranged to be by-passed by closing a switch in response to a flow in the impedance of current above a predetermined value for a predetermined time on the occurrence of an open phase conductor of the system or a ground on a phase conductor of the system and wherein fault responsive means are provided for effecting an interruption of the system phase conductors in response to a sustained ground fault, means responsive to the closing of the switch for subsequently reopening the switch one or more times at predetermined intervals within a given time when such closing has occurred. Also, I provide means for preventing the reopening of the switch as long as the system interrupting means fails to clear a sustained ground fault. Further in accordance with my invention, I provide means operative after the expiration of the time for the predetermined number of openings of the switch for giving an alarm in the event that the switch recloses after the final reopening.

My invention will be better understood from the following description when considered in connection with the accompanying sheet of drawings, and its scope will be pointed out in the appended claims.

The single figure of the accompanying drawing diagrammatically illustrates an embodiment of my invention as applied to a three-phase alternating current electric system of the type wherein a fault to ground on one phase conductor of the system substantially increases the capacitive current to ground of the ungrounded phase conductors. As shown, the system includes a transmission and distribution line comprising phase conductors 1, 2 and 3 which are arranged to be connected to a three-phase source comprising windings 4, 5 and 6 by suitable circuit interrupting means such as a circuit breaker 7. The phase conductors 1, 2 and 3 are shown with a broken line portion to give a concept of distance. It will, of course, be understood by those skilled in the art that the system may comprise other sources and lines interconnecting the various stations and suitable interrupting means like the circuit breaker 7, for example, for disconnecting the lines from the station buses on the occurrence of faults.

For controlling the opening of the circuit breaker 7 and such other circuit breakers as the system may comprise through their trip coils 7', suitable relaying means responsive to ground faults are provided. As illustrated, these relaying means comprise simple overcurrent relays 8, examples of which are well known to the art. To respond to ground faults, the relay 8 may be connected to be energized in accordance with the sum of the currents in the line conductors at the relay location. This may be done by connecting the windings of the relay across parallel connected current transformers 9, 10 and 11, respectively associated with the phase conductors 1, 2 and 3.

The windings 4, 5 and 6, which may be those of a power transformer, are shown Y-connected with the associated line 1—2—3 to provide a neutral point 12 which may be used for grounding purposes, but neutral points otherwise suitably derived may be used as will be obvious to those skilled in the art. The neutral point 12, as well as other neutral points, not shown, on the system, whether grounded through impedance devices or not, are arranged to be connected to ground to establish a predetermined grounding of the system to accord with the prearranged settings of the ground fault protective relays 8 so as to insure the desired selectivity of relaying operation, all as disclosed in United States Letters Patent 2,258,248, supra. Inasmuch, however, as it is desirable to clear as many ground faults as possible without circuit breaker operation, at least one of the neutral points of the system such, for example, as the neutral point 12, and possibly others depending on the extent of the system and also whether or not the system may at times be operated as a divided system, are grounded through suitable arc suppressing apparatus such as a ground fault neutralizer 13 after the manner and for the purpose disclosed in United States Letters Patent 1,537,371 supra. The ground fault neutralizer 13 is an impedance device whose zero phase sequence inductive reactance is such as to provide on the occurrence of a ground on a phase conductor of the system a lagging current for effectively suppressing all or part of the capacitance current to ground at the fault. In the event that the system is to be operated in separated parts at times or involves long lines, more than one neutralizer will be provided, and these will have their inductive reactances proportioned to match that portion of the system to which they apply. In other words, whether there is more than one neutralizer or not, the neutralizers are proportioned depending upon the amount of the system in service to provide enough neutralizing lagging current to suppress the capacitance current to ground of the ungrounded phase conductors of the system on the occurrence of a ground fault, which if of a transient character will be eliminated by this suppressing action.

When the ground fault is not of a transient character, however, resort is had to circuit breaker operation for isolating the faulty portion of the system without disturbing continuity of service on sound portions. In this case, it is necessary to rely upon the ground fault relay 8 and other ground fault relays of the system, but their action as heretofore pointed out can only be selective for that predetermined grounding of the system for which prearranged relay settings are made, all as set forth in United States Letters Patent 2,258,248, supra. Accordingly, to effect this grounding a predetermined time after the occurrence of a fault, in other words, after a time sufficient for the ground fault neutralizers to suppress the fault if of a transient character, arrangements are made for establishing a connection to ground around the ground fault neutralizer 13 and other neutral points to establish a connection to ground. These connections to ground may be established in any suitable manner, but as shown they may be accomplished by closing a normally open switching means 14 a predetermined time after the beginning of current flow in the ground fault neutralizer 13 and likewise at other neutral points.

The particular type of grounding switch or the way in which the grounding switches are operated to establish the ground connections or by-pass the ground fault neutralizers constitutes no part of my present invention, but I have shown an arrangement such as disclosed in United States Letters Patent 2,296,109, issued September 15, 1942. Thus, as shown, the grounding switch 14 is a normally latched open biased to close switch, the tripping of the latch 15 of which is effected by a suitable time delay sequence initiated by the operation of a relay 16. This relay is operative in dependence on the current flowing in the ground fault neutralizer 13 and may be connected to be energized from a current transformer 17 in series therewith, as shown. The normally closed contacts 18 of the relay 16 maintain the energizing circuit of a time delay dropout relay 19, which may be of the induction disk alternating current type, examples of which are well known in the art.

When the relay 19 closes its contacts 20 while the relay 16 is energized with its contacts 21 closed, the circuit of an auxiliary relay 22 is completed through a conductor 24 and b auxiliary switch contacts 25 on the grounding switch 14. This auxiliary relay 22 through its normally closed contacts 26 completes the circuit of a second time delay dropout relay 27 and, when energized, completes its own circuit through its normally open contacts 28 and opens the circuit of the relay 27. When the second time delay relay 27 drops out, the closing of its normally open contacts 28 completes the circuit of a tripping relay 29 through the conductor 24 and the b auxiliary switch contacts 25. When this relay picks up to close its normally open contacts 30, it completes the circuit of the grounding switch trip coil 31 through a conductor 32 and the b auxiliary switch contacts 33 on the grounding switch. The energization of the trip coil 31 effects the release of the spring biased latch 15 to cause the closing of the grounding switch.

If there is only one neutral point on the system metallically connected to the circuit 1—2—3, the relays 27 and 29 may be omitted and the relay 22 arranged to do the tripping. If, however, there are two or more neutral points to be grounded, then any differences in timing of the relays 19 at different locations, which resulted in the closing of one grounding switch before the closing of the others, could prevent the closing of the others if only one time delay relay 19 were used since the relays 16 would drop out with the closing of the grounding switch thus re-energizing the associated relays 19. The second timing relay 27 prevents this since no grounding switch can be closed automatically until after all of the time delay relays 19 have properly functioned.

For restoring the grounding switch 14 to its open position, it may be provided with suitable opening means indicated as a winding 34 whose circuit is controlled by the contacts 35 of a control relay 36 and a auxiliary switch contacts 37. As illustrated, this relay 36 is of the so-called hesitating control type which, when once energized to close its contacts, drops out with a time delay sufficient to insure the completion of the opening action of the grounding switch 14.

For effecting the reopening of the by-pass switch 14 a predetermined number of times at predetermined intervals within a given time, I provide a motor-driven timer 40 which is arranged to be set into operation when the by-pass switch closes. Inasmuch as such timers are well known in the art, I have shown the timer 40 schematically for clearness. Thus, as shown, the timer 40 comprises a motor 41 which is arranged to rotate four cams 42, 43, 44 and 45 in the direction indicated by the arrows thereon. As shown, these cams are mounted on a common shaft which is indicated by the dash-dot line 46. Also, as illustrated, the cams 42, 43, 44 and 45 are arranged to actuate movable contacts 47, 48, 49 and 50, respectively, which are shown in the positions they occupy when the system is normal and the by-pass switch 14 is open. Respectively associated with the movable contacts 47, 48, 49 and 50 for control thereby are pairs of spaced stationary contacts 51 and 52, 53 and 54, 55 and 56, and 57 and 58. In the specific arrangement illustrated, the cam 42 is provided with three raised portions so that the by-pass switch 14 can be reopened three times at a given interval of time. However, the specific number of reopenings permitted during a particular abnormal condition is immaterial as far as my invention is concerned. The important feature is to prevent an unlimited number of closings and openings particularly during an open phase conductor condition.

For controlling the motor 41 so as to prevent more than one reopening of the by-pass switch for each raised portion of the cam 42, I provide a timer motor control or auxiliary relay 59 whose energization is controlled by the timer 40 and a switch contacts 60 of the by-pass switch 14. The auxiliary relay 59 is provided with two sets of circuit closing contacts 61 and 62, of which the contacts 62 serve in part for sealing-in purposes as will appear more clearly in the explanation of the operation of my invention.

In order to prevent the opening of the by-pass switch 14 as long as the flow of current therethrough exceeds a predetermined value such as occurs with sustained ground faults, I provide a blocking relay 63 whose winding 64 is connected to be energized in dependence on the flow of current in the by-pass connection to ground. Thus, for example, the winding 64 may be connected in series relation with a current transformer 65 in circuit with the ground connection, as shown. The setting of the relay 63 is such that it will not pick up on the out of balance of zero phase sequence capacitive currents which occur in case of open phase conductors. Relay 63 has two sets of circuit opening contacts 66 and 67 which are respectively arranged to be connected in series relation with the circuit of the motor 41 and the winding of the closing control relay 36.

In order to prevent overlapping operation of the timers 40 when a system has two or more neutral to ground switches, I provide a coordinating or auxiliary relay 68 which has one set of circuit opening contacts 69. The energizing winding 70 of the relay 68 is connected in series relation with the contacts 61 and 62 of the timer motor control relay 59 and the contacts of the timer 40 in such a way that the associated by-pass switch and timer must be operated before the relay 68 can be energized in the normal processes of automatic control and the by-pass switch 14 must be closed. As will appear in the description of the operation of my invention, the relay 68 tends to stop the timer 40 at a point where it is just in position to open the by-pass switch 14. If the current in the grounding connection is below a value sufficient to pick up the relay 63, the motor 41 will continue to run.

In the event that the timer runs through its cycle of operations leaving the ground switch closed, I provide means for giving an alarm to show that the switch is closed. As illustrated, this alarm means is an audible device such as a bell 71 whose circuit is controlled by the timer 40 and also by the *a* switch contacts 60 of the by-pass switch 14.

Assuming the parts positioned as shown in the drawing and that a fault to ground occurs on the phase conductor 3 as indicated at 73, then the neutral point 12 will be displaced in voltage with respect to ground. In consequence of this, current flows in the ground fault neutralizer 13. If the fault is of a transitory character, it will be quickly suppressed by the neutralizing action of the ground fault neutralizer 13. If, however, the ground fault 73 is of a sustained character, then the relay 16 which picks up on flow of current above a predetermined value in the neutralizer 13 opens its contacts to drop out the time delay relay 19. With the closing of the contacts 21 by the relay 16 and the contacts 20 by the relay 19, the relay 22 is energized to effect the deenergization of the time delay dropout relay 27. The relay 22 seals itself in through its contacts 26 to keep the time delay dropout relay 27 deenergized as long as the by-pass switch 14 is open. When the time delay relay 26 closes its contacts 28, it effects the energization of the tripping relay 29 which completes the circuit of the trip coil 31 through the contacts 30, the conductor 32 and the *b* contacts 33. The closing of the by-pass switch 14 is thereby effected. The system neutral point 12 is then directly connected to ground so that there is possible a free flow of ground fault current sufficient to effect the operation of the ground fault relay 8 and other ground fault relays of the system and thereby to cause the opening of the circuit breaker 7 and other circuit breakers required to isolate the fault 73 from the rest of the system.

If instead of a ground fault a phase conductor becomes opened without being grounded, the by-pass switch 14 will be closed because there is sufficient displacement of the neutral 12 to cause the operation of the relay 16 and thereby start the sequence of operations which effects the energization of the tripping coil 31 of the by-pass switch 14.

With the closing of the by-pass switch 14, the circuit of the timer motor 41 is completed through the *a* contacts 60 of the by-pass switch, a conductor 74, the contacts 56 and 49 of the timer 40, a conductor 75, the contacts 54 and 48 of the timer, and a conductor 76 to the motor 41. In a relatively short time, the movable contact 49 moves from the contact 54 to the contact 53. The circuit of the timing motor then remains energized through the contacts 69 of the coordinating relay 68, a conductor 77, the contacts 53 and 48 of the timer 40, and the conductor 76 to the motor 41. The motor circuit may also be completed in parallel through the contacts 66 of the blocking relay 63 and a conductor 78 connected to the conductor 77 provided there is insufficient current in the ground connection through the by-pass switch 14 to pick up the blocking relay. This parallel circuit, however, will be interrupted if the abnormal circuit condition is due to a ground fault and will remain interrupted until the ground fault is cleared.

If, however, the abnormal condition is due to an open phase conductor which is not grounded, the blocking relay 63 will remain in the deenergized position shown in the drawing with its contacts closed. Shortly after the change in the position of the movable contact 48, the movable contact 49 moves from its position shown in engagement with contact 56 to engage contact 55. Subsequently, the movable contact 47 is moved from engagement with the contact 51 to engage the contact 52. The auxiliary relay 59 is now energized through a circuit comprising a conductor 79, the timer contacts 47 and 52, a conductor 80, the timer contacts 57 and 50, a conductor 81, the conductor 74 and the *a* switch contacts 60. The auxiliary relay 59 seals itself through its contacts 62 and quickly thereafter the movable contact 47 moves into engagement with the stationary contact 51. With the pickup of the relay 59, the coordinating relay 68 is energized through a circuit comprising a conductor 82, the contacts 61 of the auxiliary relay 59, a conductor 82′, the contacts 51 and 47 of the timer, the contacts 62 of the relay 59, a conductor 83, the conductor 80, the timer contacts 57 and 50, the conductors 81 and 74, and the *a* auxiliary switch contacts 60. If upon energization of the relay 68 to open its contacts 69 the blocking relay 63 is also energized to have its contacts 66 and 67 open, the timer 40 is stopped at a point where it is just in position to open the by-pass switch 14. Assuming no failure in the operation of the ground fault protective relaying arrangement of the system, the ground fault should be cleared prior to this time and the blocking relay 63 in its deenergized position.

Assuming that the blocking relay 63 is in the deenergized position shown, then the circuit of the timer motor 41 remains energized through the contacts 66 of the blocking relay, the conductors 78 and 77, the contacts 53 and 48 of the timer, and the conductor 76 to the motor 41. If at the moment the relay 59 is energized the blocking relay 63 were in the deenergized position, then the closing control relay 36 would be energized through a circuit comprising a conductor 84, the *a* contacts 39 of the by-pass switch, a conductor 85, the contacts 67 of the blocking relay 63, a conductor 86, the contacts 61 of the auxiliary relay 59, the conductor 82′, the contacts 51 and 47 of the timer, the contacts 62 of the relay 59, the conductors 83 and 80, the contacts 57 and 50 of the timer, the conductors 81 and 74, and the *a* switch contacts 60 of the by-pass switch. With the energization of the control relay 36, the circuit of the opening winding 34 of the by-pass switch 14 is completed through the contacts 35 of the relay and the *a* contacts 37 of the by-pass switch. When the by-pass switch 14 closes, its *a* contacts 39 open to deenergize the control relay 36. Also, with the opening of the by-pass switch *a* contacts 60, the auxiliary relay 59 is deenergized and drops out. With the opening of the contacts 61, the coordinating control relay 68 is deenergized and drops out to close its contacts 69. Meanwhile, the motor 41 continues to run since the timer contacts 53 and 48 remain closed, and initially the contacts 66 of the blocking relay are closed and subsequently the contacts 69 of the coordinating control relay close.

If, however, there is an open phase conductor as assumed, then immediately upon the opening of the by-pass switch, current will begin to flow in the ground connection through the neutralizer 13 thus effecting the closing of the by-pass switch 14 a second time in the manner heretofore described. It will be understood, of course, that due to the position of the cams 43, 44 and 45 no change will take place in the position of the timer movable contacts 48, 49 and 50. However, because of the second raised portion on the cam 42, the movable contact 47 will again be actuated to engage the stationary contact 52, whereupon the circuit of the auxiliary relay 59 will again be completed as heretofore traced. Again upon energization of the relay 59, the coordinating control relay 68 is actuated to open its contacts. Likewise, upon energization of the relay 59, the circuit of the control relay 36 will again be energized to effect the energization of this relay and thereby the reopening of the by-pass switch a second time. If the open phase conductor persists, the by-pass switch will again be reclosed and again reopened when the third raised portion of the cam 42 raises the movable contact 47 to engage the stationary contact 52. If the open phase conductor still persists, the by-pass switch 14 will again be closed, but this time it will remain closed because the cam 45 has moved to the position where the movable contact 50 is disengaged from the contact 57 and engages the contact 58 thereby preventing another immediate energization of the control relay 36 and also completing the circuit of the alarm 71 through the timer contacts 58 and 50, the conductors 81 and 74, and the a switch contacts 60. Also, following the third reopening of the by-pass switch, the cams 43 and 44 have turned to the position where the movable contact 48 actuated by the cam 43 has moved from stationary contact 53 to stationary contact 54 thus interrupting the circuit of the motor 41 and also the movable contact 49 has been moved by the cam 44 from the contact 55 to the contact 56 so that the parts are again set up for operation in the event of a second abnormal condition.

In case of a sustained ground fault which the system circuit interrupting means fails to clear, then the by-pass switch closes and remains closed. With the closing of the by-pass switch, the timer 40 is energized and sets up a circuit for reopening the by-pass switch as heretofore described. But since the relay 63 is picked up in consequence of current flow above a predetermined value in the by-pass connection, the timer 40 is deenergized as soon as the coordinating relay 68 is energized. As heretofore pointed out, however, the timer is set up to continue its operations as son as the relay 63 drops out. Thus, subsequently when the fault is cleared, this relay 63 drops out and the timing motor is restarted and the by-pass switch 14 is opened. If the by-pass switch remains open, the timer 40 will continue through its timing range and reset to be prepared for subsequent operation.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an alternating current electric system of the type wherein a fault to ground on one phase conductor of the system substantially increases the capacitive current to ground of the ungrounded phase conductors of the system and wherein a neutral point of the system is grounded through an impedance arranged to be by-passed by closing a switch in respones to a flow in the impedance of current above a predetermined value for a predetermined time, means responsive to the closing of the switch for reopening the switch a predetermined number of times at predetermined intervals only if the flow of current through the switch is below a predetermined value.

2. In an alternating current electric system of the type wherein a fault to ground on one phase conductor of the system substantially increases the capacitive current to ground of the ungrounded phase conductors of the system and wherein a neutral point of the system is grounded through an impedance arranged to be by-passed by closing a switch in response to a flow in the impedance of current above a predetermined value for a predetermined time, means responsive to the closing of the switch for reopening the switch a predetermined number of times at predetermined intervals, and means for preventing the reopening of the switch when the flow of current therethrough exceeds a predetermined value.

3. In an alternating current electric system having a neutral point and of the type wherein a fault to ground on one phase conductor of the system substantially increases the capacitance current to ground of the ungrounded phase conductors of the system and wherein switching means are provided for establishing a low resistance connection to ground from the neutral point on the occurrence on the system of an open phase conductor or a ground on a phase conductor, means responsive to the closing of said switching means for effecting a predetermined number of openings thereof at predetermined intervals within a given time on the occurrence of an open phase conductor, and means for blocking the opening of said switching means for the duration of a sustained ground fault on a phase conductor of the system.

4. In an alternating current electric system having a neutral point and of the type wherein a fault to ground on one phase conductor of the system substantially increases the capacitance current to ground of the ungrounded phase conductors of the system and wherein switching means are provided for establishing a low resistance connection to ground from the neutral point on the occurrence on the system of an open phase conductor or a ground on a phase conductor, timing means arranged to be started into operation on the closing of said switching means for effecting the reopening thereof, means for stopping the operation of said timing means after a predetermined time when current above a predetermined value flows through the switching means at the expiration of said time arranged to restart the timing means and to open said switching means as soon as current above said predetermined value ceases to flow in the switching means.

5. In an alternating current electric system of the type wherein a fault to ground on one phase conductor of the system substantially increases the capacitive current to ground of the ungrounded phase conductors of the system and wherein a neutral point of the system is grounded through an impedance having an inductive reactance such that the zero phase sequence inductive reactance of the system is substantially equal to the zero phase sequence capacitive reactance of the system and wherein the impedance is arranged to be by-passed by closing a switch in response to a flow in the impedance of current above a predetermined value for a predetermined time on the occurrence of an open phase conductor of the system or a ground on a phase conductor of the system and wherein fault responsive means are provided for effecting an interruption of the system phase conductors in response to a sustained ground fault, means responsive to the closing of the switch for subsequently reopening the switch, and means for preventing a reopening of the switch as long as the system interrupting means fails to clear a sustained ground fault.

6. In an alternating current electric system of the type wherein a fault to ground on one phase conductor of the system substantially increases the capacitive current to ground of the ungrounded phase conductors of the system and wherein a neutral point of the system is grounded through an impedance having an inductive reactance such that the zero phase sequence inductive reactance of the system is substantially equal to the zero phase sequence capacitive reactance of the system and wherein the impedance is arranged to be by-passed by closing a switch in response to a flow in the impedance of current above a predetermined value for a predetermined time on the occurrence of an open phase conductor of the system or a ground on a phase conductor of the system and wherein fault responsive means are provided for effecting an interruption of the system phase conductors in response to a sustained ground fault, means responsive to the closing of the switch for subsequently reopening the switch a predetermined number of times at predetermined intervals within a given time on the occurrence of an open phase conductor of the system, and means for preventing a reopening of the switch as long as the system interrupting means fails to clear a sustained ground fault.

7. In an alternating current electric system of the type wherein a fault to ground on one phase conductor of the system substantially increases the capacitive current to ground of the ungrounded phase conductors of the system and wherein a neutral point of the system is grounded through an impedance having an inductive reactance such that the zero phase sequence inductive reactance of the system is substantially equal to the zero phase sequence capacitive reactance of the system and wherein the impedance is arranged to be by-passed by closing a switch in response to a flow in the impedance of current above a predetermined value for a predetermined time on the occurrence of an open phase conductor of the system or a ground on a phase conductor of the system and wherein fault responsive means are provided for effecting an interruption of the system phase conductors in response to a sustained ground fault, normally inoperative timing means arranged to be set into operation when the by-pass switch closes, relay means controlled by said timing means for reopening the by-pass switch a predetermined number of times at predetermined intervals within a given time, and means adapted to be connected to respond to the current flowing in the by-pass switch for preventing an opening of the switch when such current exceeds a predetermined value.

8. In an alternating current electric system of the type wherein a fault to ground on one phase conductor of the system substantially increases the capacitive current to ground of the ungrounded phase conductors of the system and wherein a neutral point of the system is grounded through an impedance having an inductive reactance such that the zero phase sequence inductive reactance of the system is substantially equal to the zero phase sequence capacitive reactance of the system and wherein the impedance is arranged to be by-passed by closing a switch in response to a flow in the impedance of current above a predetermined value for a predetermined time on the occurrence of an open phase conductor of the system or a ground on a phase conductor of the system and wherein fault responsive means are provided for effecting an interruption of the system phase conductors in response to a sustained ground fault, means responsive to the closing of the switch for subsequently reopening the switch a predetermined number of times at predetermined intervals within a given time on the occurrence of an open phase conductor of the system, means for preventing a reopening of the switch as long as the system interrupting means fails to clear a sustained ground fault, and means operative after the expiration of said time in the event that the switch again recloses for giving an alarm.

9. In an alternating current electric system of the type wherein a fault to ground on one phase conductor of the system substantially increases the capacitive current to ground of the ungrounded phase conductors of the system and wherein a neutral point of the system is grounded through an impedance having an inductive reactance such that the zero phase sequence inductive reactance of the system is substantially equal to the zero phase sequence capacitive reactance of the system and wherein the impedance is arranged to be by-passed by closing a switch in response to a flow in the impedance of current above a predetermined value for a predetermined time on the occurrence of an open phase conductor of the system or a ground on a phase conductor of the system and wherein fault responsive means are provided for effecting an interruption of the system phase conductors in response to a sustained ground fault, normally inoperative timing means arranged to be set into operation when the by-pass switch closes, relay means controlled by said timing means for reopening the by-pass switch a predetermined number of times at predetermined intervals within a given time, means adapted to be connected to respond to the current flowing in the by-pass switch for preventing an opening of the switch when such current exceeds a predetermined value, and coordinating relay means controlled by the timing means and said preventing means for stopping the operation of the timing means when the current through the switch exceeds a predetermined value.

PHILIP H. LIGHT.

Certificate of Correction

Patent No. 2,421,630. June 3, 1947.

PHILIP H. LIGHT

It is hereby certified that errors appear in the printed specification of the above numbered patent requiring correction as follows: Column 6, line 65, for the word "of" after "balance" read *or*; column 9, line 67, for "son" read *soon*; column 10, line 14, for "respones" read *response*; and that the said Letters Patent should be read with these corrections therein that the same may conform to the record of the case in the Patent Office.

Signed and sealed this 19th day of August, A. D. 1947.

[SEAL]

LESLIE FRAZER,
*First Assistant Commissioner of Patents.*